Sept. 3, 1940.  S. H. CALDWELL  2,213,690
STABILIZER
Filed Dec. 23, 1937  2 Sheets-Sheet 1
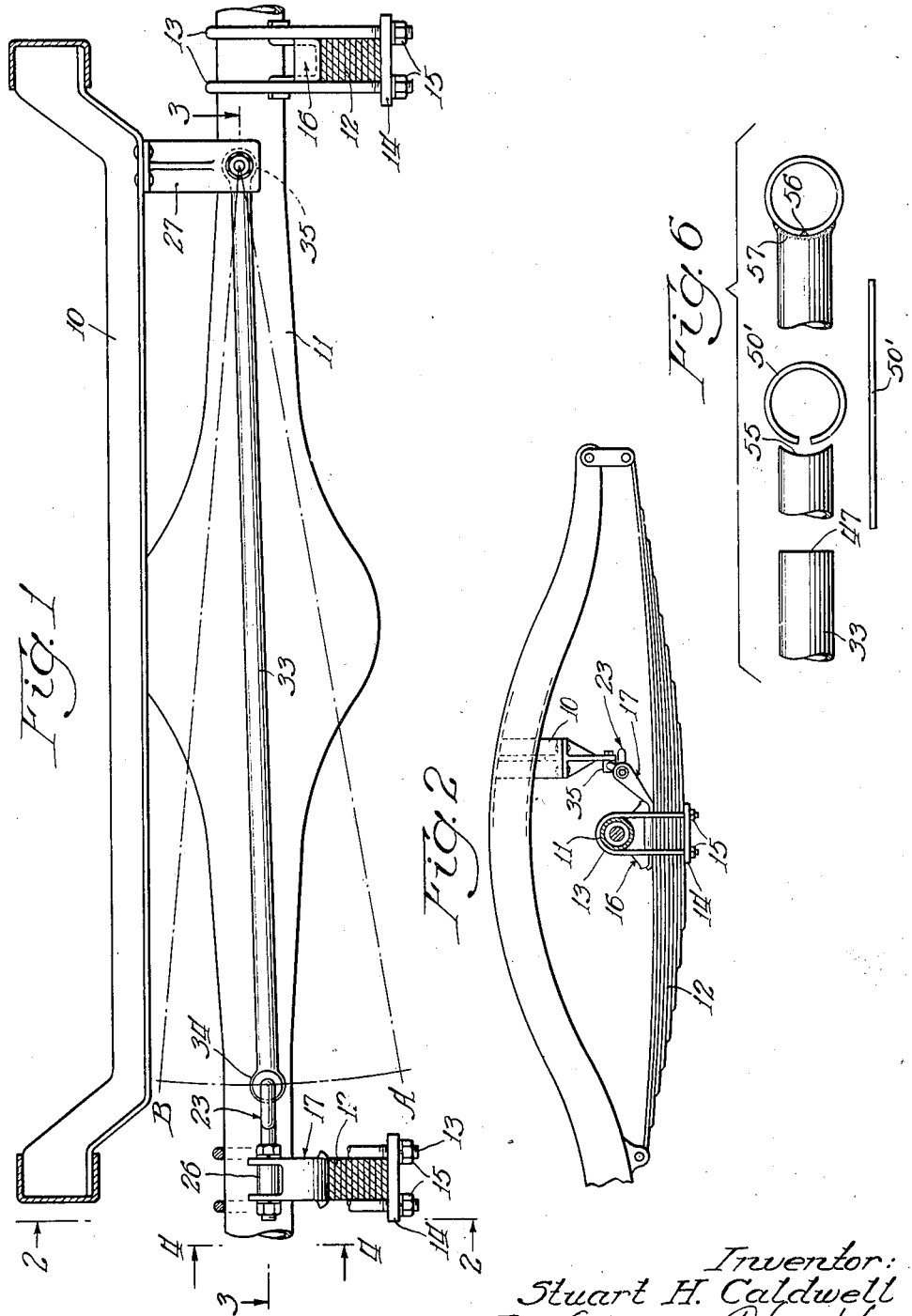
Inventor:
Stuart H. Caldwell
By: Edward C. Fitzbaugh
Atty.

Sept. 3, 1940. S. H. CALDWELL 2,213,690
STABILIZER
Filed Dec. 23, 1937 2 Sheets-Sheet 2
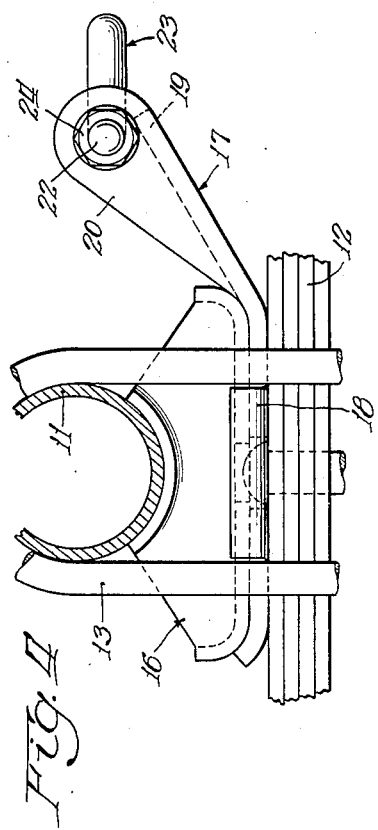
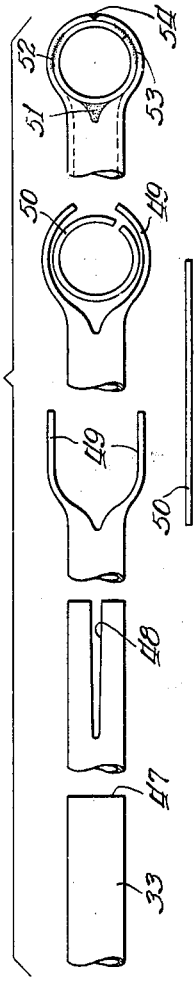
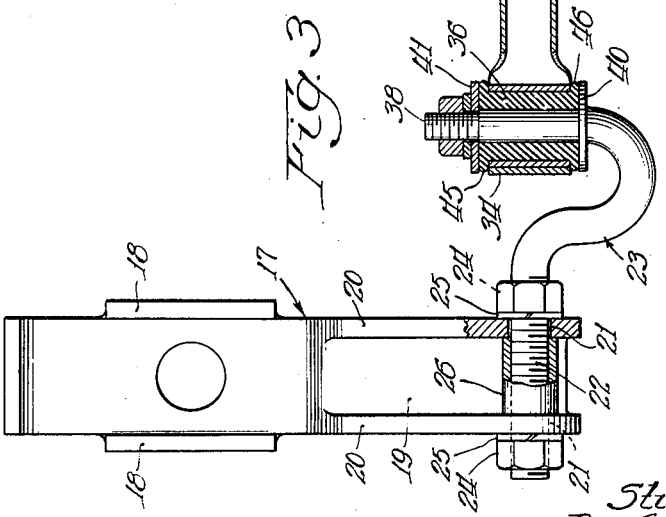
Inventor:
Stuart H. Caldwell
By: Edward C. Gritzbaugh
Atty.

Patented Sept. 3, 1940

2,213,690

UNITED STATES PATENT OFFICE 2,213,690

STABILIZER

Stuart H. Caldwell, Detroit, Mich., assignor to Borg-Warner Corporation, Chicago, Ill., a corporation of Illinois Application December 23, 1937, Serial No. 181,277

5 Claims. (Cl. 267—67)

This invention relates to spring driving devices, and particularly to means for constraining the spring to move in the direction in which it is most efficient.

For purposes of illustration, this invention will be described with reference to the rear axle construction of an automobile, but it is understood that it is not limited in application to such a construction.

The object of this invention is to provide a spring suspension which prevents the spring from being operated in a direction for which it was not designed, but which nevertheless does not interfere with the normal operation of the spring.

Another object of this invention is to provide a sway eliminator for an automobile which will prevent lateral forces from being transmitted to the springs of a vehicle.

Another object of this invention is a novel means for insulating the chassis from shocks which requires a minimum of parts and which is readily assembled.

These and other objects of this invention will become apparent from the following description when taken together with the accompanying drawings in which:

Fig. 1 is an elevation of a partial rear axle and chassis assembly showing the novel sway eliminator connected thereto;

Fig. 2 is a fragmentary side elevation of the chassis assembly;

Fig. 3 is an enlarged plan view of the sway eliminator assembly;

Fig. 4 is a fragmentary side elevation of a bracket used in the sway eliminator, showing the manner of attachment to the axle;

Fig. 5 shows the steps used in the method of forming the eyes in the tube used in the sway eliminator; and Fig. 6 shows an alternative method of forming eyes in the tube.

In its preferred form this invention comprises a bracket secured to the chassis of a car at one side thereof, a bracket secured to the car axle at the opposite side of the car, a C shaped rod secured to the axle bracket and providing a longitudinal pivot, and a rigid member pivoted to the C shaped rod and to the chassis bracket. Novel resilient bushings are provided at the pivots to absorb vibrations and shocks. The rigid member is preferably formed from a tube, and to reduce the cost of the tube, the longitudinal seam need not be welded except at the ends. The ends of the tube are formed into eyes and reinforced by bushings welded thereto.

Referring now to the drawings for a detailed description of the invention, 10 is a cross member of a chassis for a vehicle such as an automobile. The chassis is supported on a rear axle 11 by resilient means 12 which may be of the leaf spring type as shown, or the equivalent. Axle 11 is secured to the resilient means by U bolts 13, the ends of which pass through straps 14 and are locked by nuts 15 against the straps. An axle pad 16 is used to permit the springs to be lowered relative to axle 11.

Intermediate pad 16 and resilient means 12 is a strut axle bracket 17 having up-turned sides 18 which assist in preventing rotation of bracket 17 relative to axle 11 by coaction with U bolts 13 and the sides of pad 16. The free end 19 of bracket 17 is bent upward and provided with flanges 20 which are apertured as at 21 to receive the threaded portion 22 of a C shaped rod 23. Said threaded portion 22 is secured to bracket 17 by means of nuts 24 and washers 25 which serve to clamp flanges 20 between them against a cylindrical spacer 26. The opposite end of C shaped rod 23 is bent at right angles to portion 22 so that it is in general parallel with the axis of the car.

At the side of frame 10 opposite bracket 17 is a second bracket 27 which is rigidly secured by any suitable means to frame member 10. Said bracket 27 has a tapered aperture 28 into which is drawn the correspondingly tapered portion 29 of a pin 30, the drawing action being supplied by a nut 31 cooperating with threaded end 32 of pin 30. Said pin 30 thus is parallel to the bent end of C shaped rod 23.

Threaded over rod 23 and pin 30 is a tube 33 the ends 34 and 35 of which are formed into eyes by methods hereinafter described. The tube may be formed from rectangular stock, or may be of rectangular section, and the longitudinal seam need not be welded thereby effecting a substantial economy. The mechanical transmission of vibrations from bracket 17 associated with axle 11 to bracket 27 on frame member 10 is prevented through the use of bushings 36 and 37 between eyes 34 and 35 and their respective rod and pin supports. For simplicity of manufacture, the bushings are made of resilient material such as rubber or the like, and are formed initially as apertured cylinders. The free end 38 of rod 23 and the free end 39 of pin 30 are threaded and the bushings are then compressed between washers 40 and 41 on rod 23 and 42 and 43 on pin 30 respectively. Washer 40 is welded on or otherwise secured against axial movement relative to rod 23, and washer 42 is pressed on a knurled surface 44 formed on pin 30.

It is apparent that as the bushings are compressed, the excess material will form flanges between the washers and the eyes of tube 33, thereby preventing metallic contact between the tube and supporting rod and pin. The washers are initially formed with one end flanged, as illustrated by bushing 37 which is shown in the free position, and the correct axial spacing on the rod or pin relative to the washers is assured by an inner bushing 37' or by shoulders as on rod 38. When fully compressed, uniform flanges 45 and 46 are formed on the resilient bushing between the eyes of tube 33 and the washers.

Although a bushing is shown at each eye, it is understood that but one eye may be insulated against the transmission of sound if desired, and the other made a simple metallic bearing.

Referring now to Fig. 1, it will be observed that bracket 27 is so located relative to the bent portion of C shaped rod 23 that vertical motion of axle 11 relative to frame member 10 causes said portion of rod 23 to describe a substantially flat arc. The relative axial movement of axle 11 and frame member 10 is negligible over the small arc described under ordinary operating conditions, and even under extreme conditions, such as at A or B, the axial movement is scarcely perceptible. Tube 33 is preferably set at a slight angle to the horizontal with the vehicle empty so that with an average load the tube will be horizontal. It will be observed that the spacing between brackets 17 and 27 may be adjusted by nuts 24 in the threaded portion of rod 23.

Referring now to Figs. 5 and 6 for details of construction of tube 33, the steps used in the formation of the eyes are as follows:

The end 47 of tube 33 is shown after the tube has been cut to length. Said end 47 is preferably cut square with the axis of the tube. Next, the end is slotted axially as at 48, following which the slotted portion of the tube is flared outward and flattened to form a forked end having tines 49.

Since tube 33 is hollow, it is necessary to close off the juncture between tines 49, and this is done by means of a bushing. Said bushing is formed from a rectangular strip of metal 50 which is curled to a cylindrical form and inserted between tines 49. With the bushing formed, tines 49 are bent, preferably over a suitable mandrel, to a cylindrical form and the bushing is inserted into the eye thus formed. The final steps include welding the bushing to the eye at points such as 51, 52 and 53, and welding the abutting ends of tines 49 together at 54. The resulting eye construction gives a reinforced end with the hollow portion of the tube closed off and a cylindrical confining surface for the resilient bushing subsequently to be inserted and compressed therein.

Fig. 6 shows an alternative tube-end construction. Starting with tube 33 cut off squarely at 47 as before, said end 47 is next milled or ground to present a cylindrically contoured edge 55. A bushing is formed as before from a rectangular strip 50', and after it has been curled, its edges may be welded together as at 56 and the bushing is then welded at 57 to edge 55. For ease of manufacture, strip 50' may be formed into a long tube which is welded and then cut to length, the individual lengths then being welded to tube 33 to form the eye thereof as before.

The structure hereinabove described is simple in construction, requires no lubricant, and can be applied to any spring-suspended structure wherein the springs are capable of moving in a plurality of planes. It does not interfere with the normal operation of the springs, and maintains the proper relation between the springs and the direction of application of force on the springs. The springs are, therefore, free of stresses which they are not designed to take, and hence operate more efficiently. Relative lateral movement between the frame of the vehicle and the axle is reduced to a minimum so that in the case of automobiles, the wheel housings can be made narrower and the seat width between housings consequently greater. In actual installations, the seat width has been increased as much as three inches. The structure disclosed also steadies the rear axle assembly and eliminates a vibration therein which is particularly noticeable in heavy cars travelling at high speed. Transmission of audible vibrations is prevented by the resilient bushings.

It is understood that the foregoing description is merely illustrative of the preferred embodiments of the invention, and that the scope of the invention, therefore, is not to be limited thereto, but is to be determined by the appended claims.

I claim:

1. In combination a frame, an axle, a spring supporting the frame from the axle and adapted to be driven in a direction perpendicular to the axle, a link substantially parallel to the axle, a bracket secured to the frame and pivotally connected to one end of the link, a bracket secured to the spring, and a C-shaped rod secured to the last mentioned bracket and forming a pivot for the other end of the link, whereby said spring is constrained by said link to move substantially perpendicularly to the axle.

2. The combination as described in claim 1, said link comprising a tube the ends of which are formed into eyes, and bushings welded to said eyes.

3. The combination as described in claim 1, said link comprising a tube and bushings welded transversely of the axis of the tube to form eyes.

4. In combination a frame, an axle housing, a spring supporting the frame from the housing and adapted to be driven in a direction perpendicular to the housing, a bracket secured to the frame and having a pivot pin extending therefrom, a bracket secured to the spring, a C-shaped rod secured to the spring bracket and forming a pivot which is parallel to the pivot pin, a tubular link having eyes at the ends thereof, bushings in the eyes, resilient bushings threaded over the pivot and pivot pin, said link being threaded over the resilient bushings, and means for compressing the resilient bushings between said pivot, pivot pins and eye bushings to form a vibration absorbing connection therebetween.

5. In combination a frame, an axle, a spring supporting the frame from the axle and adapted to be driven in a direction perpendicular to the axle, a link substantially parallel to the axle, a bracket secured to the frame and pivotally connected to one end of the link, a bracket secured to the spring, a rod secured to the bracket and forming a pivot for the other end of the link, whereby said spring is constrained by said link to move substantially perpendicularly to the axle, and means for adjusting the length of the rod to alter the spacing between the brackets.

STUART H. CALDWELL.